United States Patent
Hwangbo et al.

(10) Patent No.: US 11,397,345 B2
(45) Date of Patent: Jul. 26, 2022

(54) METHOD FOR ETCHING A LIQUID CRYSTAL PANEL COMPRISING INSTALLING A MASKING TAPE ON ENTIRE SURFACES OF A FIRST SUBSTRATE AND A SECOND SUBSTRATE

(71) Applicant: KORTEK CORPORATION, Incheon (KR)

(72) Inventors: Woo Hwangbo, Yongin-si (KR); Hae Won Chae, Hwaseong-si (KR); Young Il Park, Incheon (KR); Ji Woong Park, Jeonju-si (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 17/414,049

(22) PCT Filed: Dec. 13, 2019

(86) PCT No.: PCT/KR2019/017678
§ 371 (c)(1),
(2) Date: Jun. 15, 2021

(87) PCT Pub. No.: WO2020/138787
PCT Pub. Date: Jul. 2, 2020

(65) Prior Publication Data
US 2022/0057668 A1     Feb. 24, 2022

(30) Foreign Application Priority Data
Dec. 27, 2018   (KR) .................. 10-2018-0170546

(51) Int. Cl.
*G02F 1/1333*     (2006.01)
*C03C 15/00*      (2006.01)
*G02F 1/1345*     (2006.01)

(52) U.S. Cl.
CPC ............ *G02F 1/1333* (2013.01); *C03C 15/00* (2013.01); *G02F 1/13452* (2013.01); *G02F 1/133302* (2021.01)

(58) Field of Classification Search
CPC ...................... G02F 1/136231; G02F 1/13625
See application file for complete search history.

(56) References Cited

U.S. PATENT DOCUMENTS

2015/0301390 A1* 10/2015 Kim .................. G02F 1/133305
29/825
2017/0351135 A1   12/2017 Kim et al.

FOREIGN PATENT DOCUMENTS

JP        2000112399 A  *  4/2000
JP        3550027 B2       4/2004
(Continued)

OTHER PUBLICATIONS

International Search Report for PCT/KR2019/017678 dated Mar. 19, 2020.

*Primary Examiner* — Paul C Lee
(74) *Attorney, Agent, or Firm* — Schmeiser, Olsen & Watts, LLP (57) ABSTRACT

Provided is a liquid crystal panel and a method for etching a liquid crystal panel, the liquid crystal panel including: a first substrate; a second substrate installed at a location facing the first substrate with a liquid crystal layer therebetween; a driving circuit unit connected to the second substrate; and a masking tape integrally surrounding the edges of the first substrate and the second substrate.

3 Claims, 5 Drawing Sheets (56) References Cited

FOREIGN PATENT DOCUMENTS

| | | | | |
|---|---|---|---|---|
| JP | 2009047897 A | * | 3/2009 | |
| KR | 10-2008-0081495 A | | 9/2008 | |
| KR | 10-1333770 B1 | | 11/2013 | |
| KR | 10-2014-0053774 A | | 5/2014 | |
| KR | 101624714 B1 | * | 5/2016 | ............. C03C 15/00 |
| KR | 10-2016-0112123 A | | 9/2016 | |
| WO | WO-2017171236 A1 | * | 10/2017 | ............. B32B 37/12 |

* cited by examiner

METHOD FOR ETCHING A LIQUID CRYSTAL PANEL COMPRISING INSTALLING A MASKING TAPE ON ENTIRE SURFACES OF A FIRST SUBSTRATE AND A SECOND SUBSTRATE

CROSS-REFERENCE TO RELATED APPLICATIONS

This application claims priority to PCT Application No. PCT/KR2019/017678, having a filing date of Dec. 13, 2019, based on KR 10-2018-0170546, having a filing date of Dec. 27, 2018, the entire contents all of which are hereby incorporated by reference.

FIELD OF TECHNOLOGY

The following relates to a liquid crystal panel and a method of etching a liquid crystal panel, and more particularly, to a liquid crystal panel and a method of etching a liquid crystal panel, in which the liquid crystal panel is protected using integrated masking tape to reduce defects due to infiltration of an etching solution.

BACKGROUND

With the development of the information society, display devices capable of displaying information are being actively developed. The display devices include liquid crystal display (LCD) devices, organic electro-luminescence display devices, plasma display panel devices, and field emission display devices.

Among the display devices, since the LCD devices have advantages of a light-weight, short, and small design, low power consumption, and a full-color video implementation, the LCD devices are being widely applied to mobile phones, navigation devices, monitors, televisions, and the like.

The LCD device adjusts light transmittance of liquid crystal cells on a liquid crystal panel to display an image corresponding to a video signal. Typically, the liquid crystal panel includes a lower substrate, an upper substrate, and a liquid crystal layer interposed therebetween.

A thin film transistor (TFT)-LCD using a TFT as a switching element is mainly used as the LCD device. A plurality of display signal lines, such as gate lines, data lines, and a plurality of TFTs, and pixel electrodes, are formed on a lower substrate of two substrates of the liquid crystal panel, which are disposed to face each other, and a color filter and a common electrode are formed on an upper substrate of the two substrates.

Since the liquid crystal panel is usually manufactured in a flat shape, when a curved display is required, an etching solution is sprayed onto the liquid crystal panel to thin the liquid crystal panel to a set thickness, and then a process of bending the liquid crystal panel is performed.

A driving circuit may be installed on an edge of the liquid crystal panel and may include a printed circuit board (PCB) through which signals are transmitted and a tape carrier package (TCP) which connects the PCB to the liquid crystal panel. In addition, when the etching solution is sprayed on the edge of the liquid crystal panel, the edge of the liquid crystal panel can be easily broken. Thus, a masking process is performed to prevent the etching solution from being sprayed on the edge of the liquid crystal panel.

In order to protect a driving circuit, which is exposed when the liquid crystal panel is etched, and prevent defects due to infiltration of an etching solution into a bonded liquid crystal panel, an acid-resistant film is installed in the form of surrounding the driving circuit.

In addition, masking is performed on four sides of an edge of the liquid crystal panel using masking tape made of an acid-resistant material, and then the liquid crystal panel is etched. When the masking is performed, since masking tape is installed on the edge of the liquid crystal panel, an overlapping portion of the masking tape occurs in a region of the edge of the liquid crystal panel.

Since the masking tape used during the masking has a predetermined thickness, a small gap occurs in a region in which the masking tape overlaps. Therefore, there is a problem in that, during etching, the etching solution infiltrates into a gap in the region in which the masking tape overlaps such that the driving circuit or the liquid crystal panel is damaged.

In addition, when the masking tape is removed in a state in which a thickness of the liquid crystal panel is decreased after the liquid crystal panel is etched, there is a problem of a high probability of the liquid crystal panel being damaged.

As adhesion of the masking tape is strong, tightness between the liquid crystal panel and the masking tape is increased to effectively prevent infiltration of the etching solution. However, when the masking tape is removed, an adhesive may be adhered to the liquid crystal panel to cause stains or foreign material defects. Therefore, after the etching is completed, physical cleaning is additionally performed on an adhesive surface of the masking tape, and thus there is a problem in that productivity is degraded. Thus, when the masking tape is selected, since the masking tape should be selected in consideration of adhesive strength and a delamination force, there is a problem in that a range of choices is limited. Therefore, there is a need to solve such a problem.

The background art of the present invention is disclosed in Korean Patent Registration No. 10-1333770 (registered on Nov. 21, 2013, entitled "Etching device, Apparatus for manufacturing display panel with curved shape and of comprising the device, Method for manufacturing display panel with curved shape by using the apparatus, display panel with curved shape manufactured by the method").

SUMMARY

An aspect relates to providing a liquid crystal panel and a method of etching a liquid crystal panel, in which the liquid crystal panel is protected using integrated masking tape to reduce defects due to infiltration of an etching solution.

One aspect of embodiments of the present invention provides a liquid crystal panel including a first substrate, a second substrate installed at a location facing the first substrate with a liquid crystal layer interposed therebetween, a driving circuit connected to the second substrate, and masking tape configured to integrally surround edges of the first substrate and the second substrate.

The masking tape may be in the form of a rectangular band having a hollow therein.

The masking tape may be installed to surround an end portion of the driving circuit connected to the second substrate.

Another aspect of embodiments of the present invention provides a method of etching a liquid crystal panel, which includes installing masking tape on entire surfaces of a first substrate and a second substrate, installing an encapsulation member configured to surround an outer side of a driving circuit connected to the second substrate, removing an inner side of the masking tape facing etched regions of the first substrate and the second substrate, etching the first substrate and the second substrate using an etching solution, removing the encapsulation member, and removing an edge of the masking tape.

In the installing of the masking tape, the masking tape may be adhered and fixed to each of the first substrate and the second substrate and formed of a single film.

In the installing of the masking tape, an area of the masking tape may be greater than an area of the first substrate or the second substrate.

In the installing of the masking tape, the masking tape may be installed to surround an end portion of the driving circuit connected to the second substrate.

The removing of the inner side of the masking tape may include cutting the inner side of the masking tape using a laser or a knife for removing a film and removing the masking tape which is cut from the first substrate and the second substrate.

In the removing of the inner side of the masking tape, a shape of the masking tape of which the inner side is removed may be a shape of a rectangular band.

The removing of the edge of the masking tape may include cutting the masking tape protruding outward from the first substrate and the second substrate.

In accordance with a liquid crystal panel and a method of etching a liquid crystal panel according to embodiments of the present invention, the liquid crystal panel and a circuit are protected from an etching solution using masking tape made of a single film so that defects due to infiltration of an etching solution can be reduced.

In addition, the masking tape installed on edges of a first substrate and a second substrate is not removed so that it is possible to reduce damage of the liquid crystal panel which occurs when the masking tape is removed.

In addition, masking tape having adhesive strength that is stronger than adhesive strength of masking tape according to the related art can be used so that tightness can be improved and defects of the first substrate and the second substrate due to infiltration of the etching solution can be reduced.

In addition, the masking tape made of a single member is used so that a production process can be simplified and quality of the liquid crystal panel can also be improved.

BRIEF DESCRIPTION

Some of the embodiments will be described in detail, with reference to the following figures, wherein like designations denote like members, wherein.

DETAILED DESCRIPTION

Hereinafter, a liquid crystal panel and a method of etching a liquid crystal panel according to one embodiment of the present invention will be described with reference to the accompanying drawings. In the following description, thicknesses of lines and sizes of components shown in the drawings may be exaggerated for clarity and convenience of description.

In addition, the terms described below are defined in consideration of the functions in embodiments of the present invention, and these terms may be varied according to the intent or custom of a user or an operator. Therefore, these terms should be defined on the basis of the contents throughout the present application.

Figure 1:
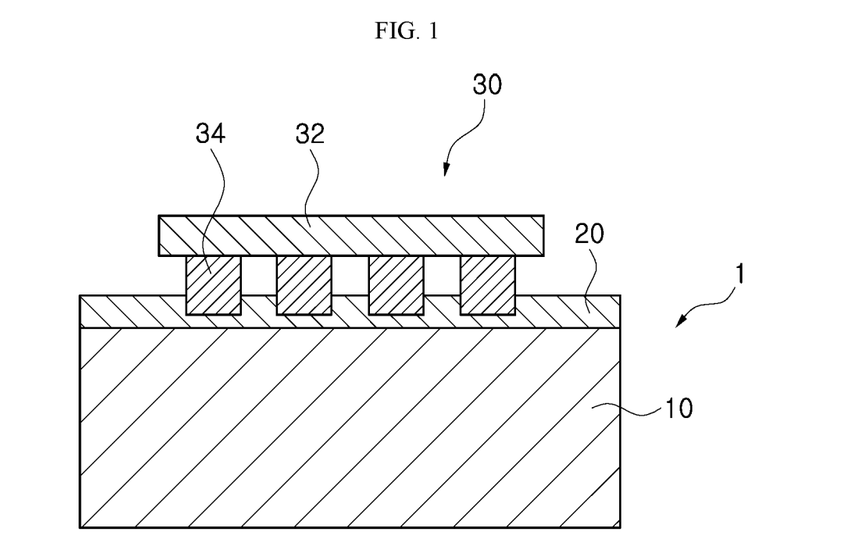
FIG. 1 is a diagram illustrating a state in which a driving circuit is connected to a second substrate according to one embodiment of the present invention.
Figure 2:
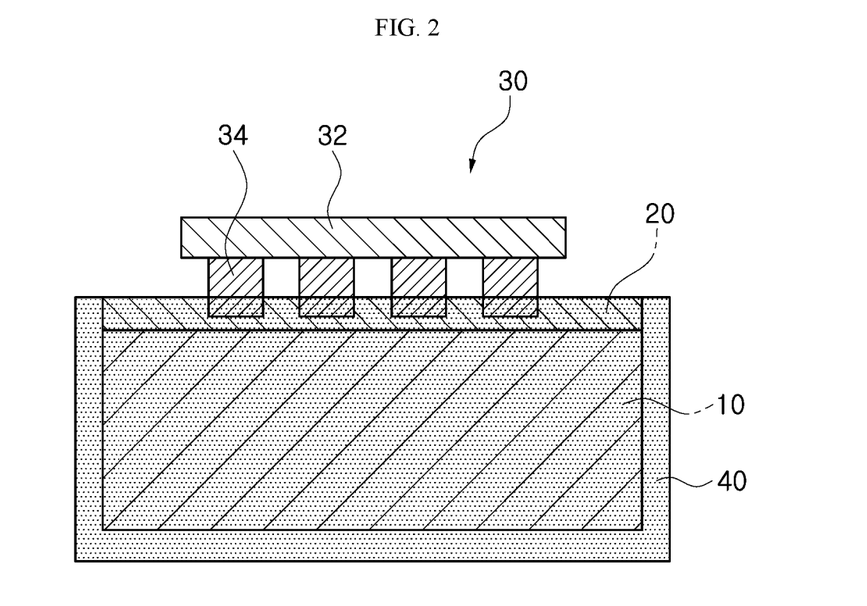
FIG. 2 is a diagram illustrating a state in which masking tape is installed on a first substrate and the second substrate according to one embodiment of the present invention.
Figure 3:
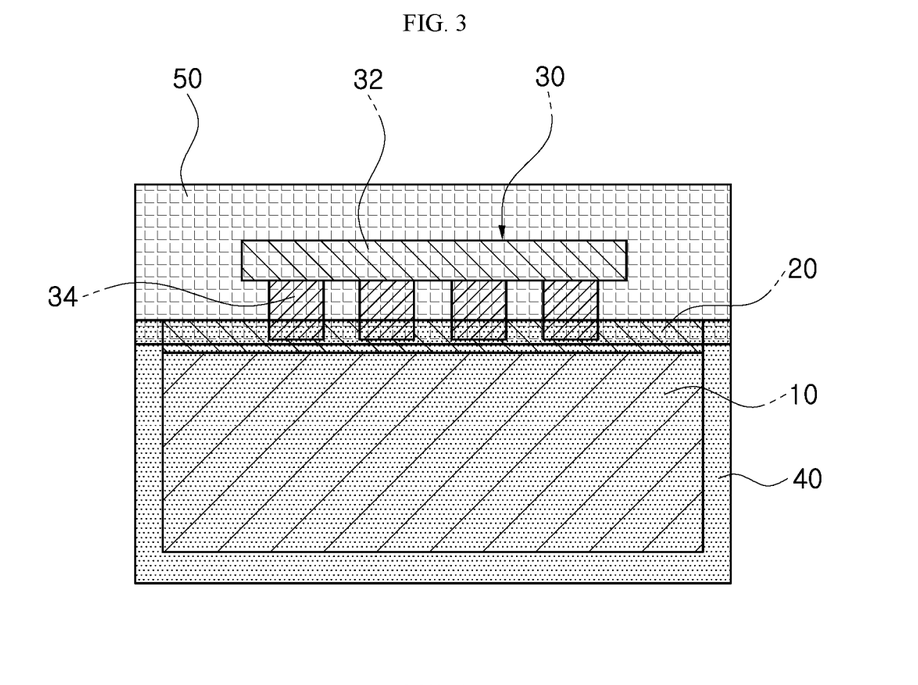
FIG. 3 is a diagram illustrating a state in which an encapsulation member is installed on an outer side of the driving circuit according to one embodiment of the present invention.
Figure 4:
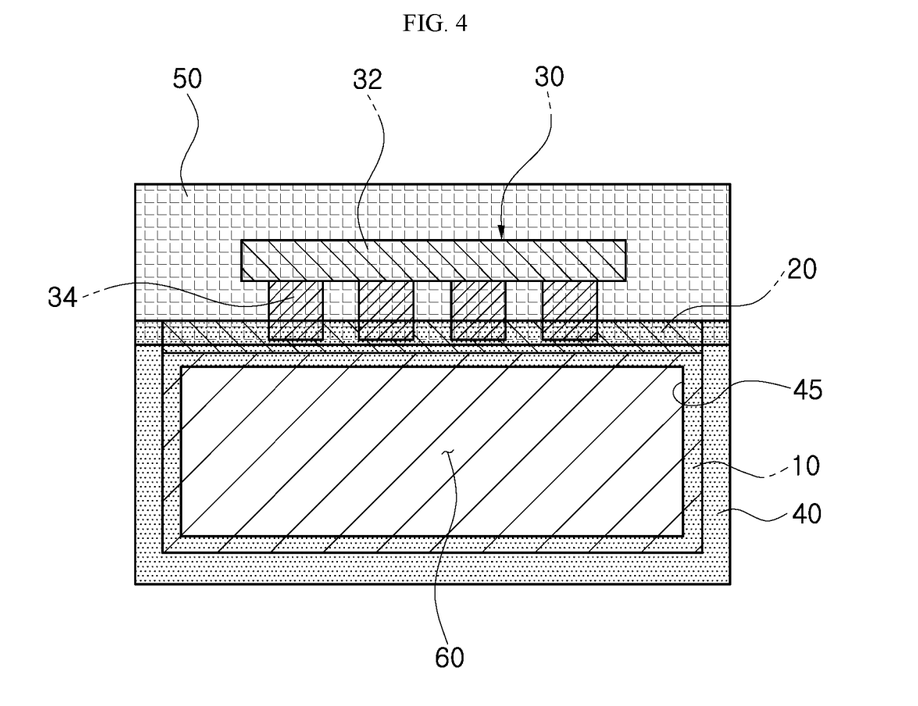
FIG. 4 is a diagram illustrating a state in which the masking tape is removed from an etched region according to one embodiment of the present invention.
Figure 5:
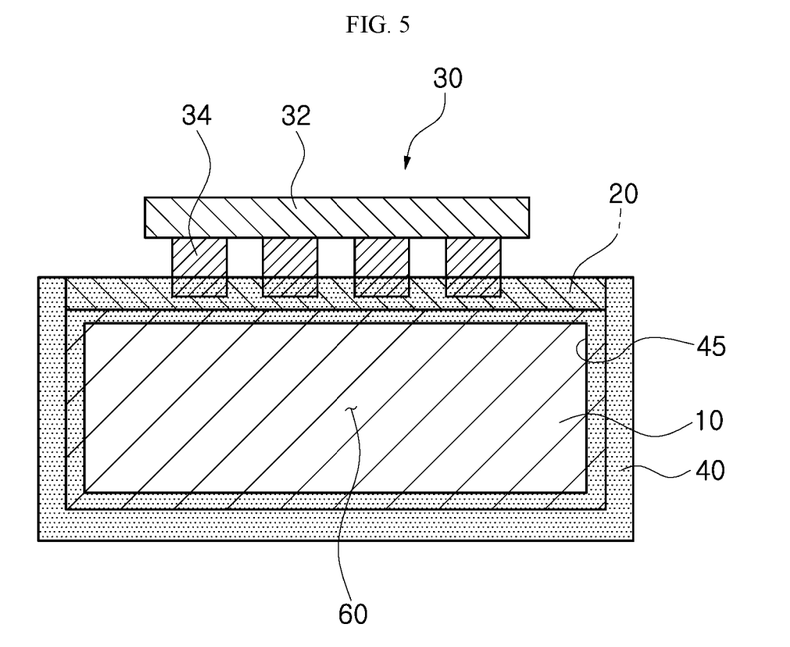
FIG. 5 is a diagram illustrating a state in which the encapsulation member is removed according to one embodiment of the present invention.
Figure 6:
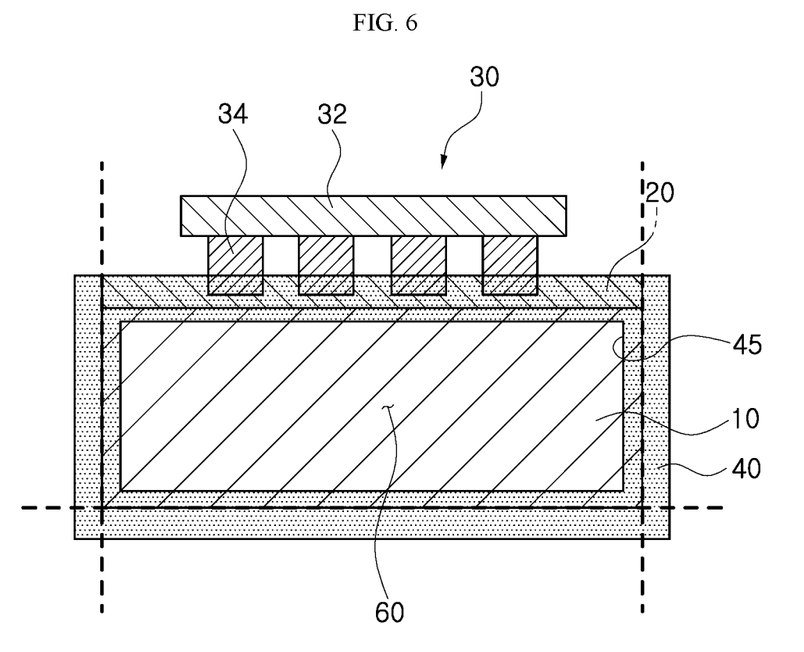
FIG. 6 is a diagram illustrating that a position for cutting an edge of the masking tape is indicated according to one embodiment of the present invention.
Figure 7:
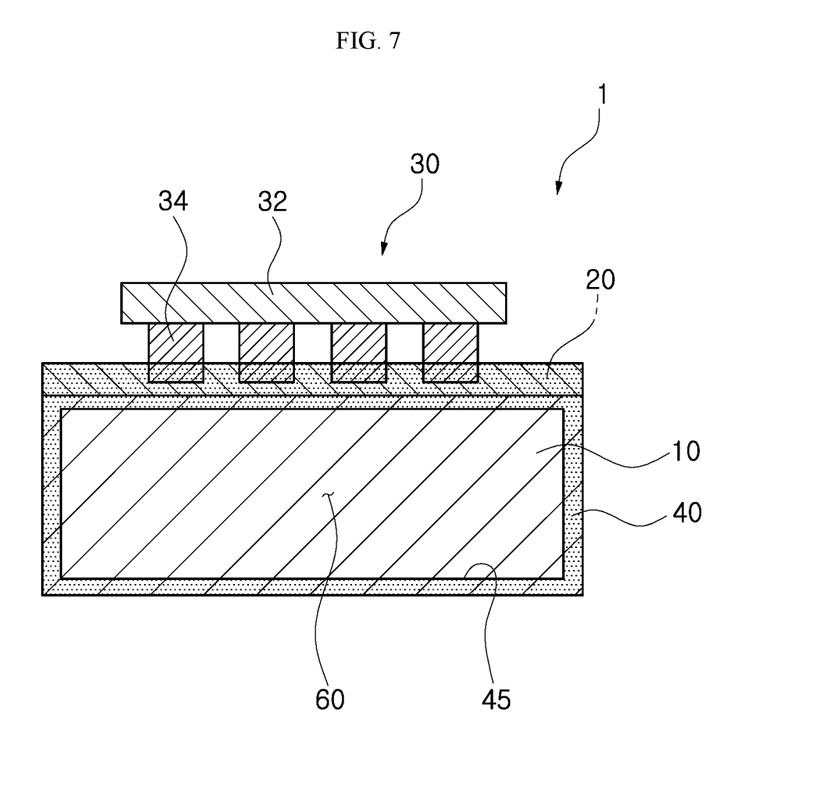
FIG. 7 is a diagram illustrating a liquid crystal panel in which the edge of the masking tape is removed according to one embodiment of the present invention.

FIG. 1 is a diagram illustrating a state in which a driving circuit is connected to a second substrate according to one embodiment of the present invention, FIG. 2 is a diagram illustrating a state in which masking tape is installed on a first substrate and the second substrate according to one embodiment of the present invention, FIG. 3 is a diagram illustrating a state in which an encapsulation member is installed on an outer side of the driving circuit according to one embodiment of the present invention, FIG. 4 is a diagram illustrating a state in which the masking tape is removed from an etched region according to one embodiment of the present invention, FIG. 5 is a diagram illustrating a state in which the encapsulation member is removed according to one embodiment of the present invention, FIG. 6 is a diagram illustrating that a position for cutting an edge of the masking tape is indicated according to one embodiment of the present invention, and FIG. 7 is a diagram illustrating a liquid crystal panel in which the edge of the masking tape is removed according to one embodiment of the present invention.

As shown in FIGS. 1 to 7, a liquid crystal panel 1 according to one embodiment of the present invention includes a first substrate 10, a second substrate 20 installed at a position facing the first substrate 10 with a liquid crystal layer interposed therebetween, a driving circuit 30 connected to the second substrate 20, and masking tape 40 for integrally surrounding edges of the first substrate 10 and the second substrate 20.

According to embodiments of the present invention, in order to safely protect the first substrate 10 and the second substrate 20 from an etching solution when the first substrate 10 and the second substrate 20 are etched, a single piece of masking tape 40 having a large area is attached to the first substrate 10 and the second substrate 20. In addition, since the masking tape 40 located in a region to be etched is cut and removed, only an etched region 60 may be guided to be etched, and since an overlapping section of the masking tape 40 and a gap do not occur, it is possible to prevent infiltration of the etching solution.

In addition, the liquid crystal panel 1 includes a region in which a screen is displayed and the driving circuit 30 for applying an electrical signal so as to drive the liquid crystal panel 1. In the liquid crystal panel 1, only the region in which the screen is displayed is set as the etched region 60, and surfaces of the first substrate 10 and the second substrate 20 are etched using an etching solution having acidity to decrease thicknesses of the first substrate 10 and the second substrate 20.

Glass is used the most as a base material of each of the first substrate 10 and the second substrate 20, and the driving circuit 30 includes a printed circuit board 32 which is a plastic substrate, and a flexible connector 34 which is a thin film. In addition, in order to prevent the first substrate 10 and the second substrate 20 from being damaged by the etching solution during the etching, a process of masking the first substrate 10 and the second substrate 20 using the masking tape 40 made of an acid-resistant material is necessary.

In addition, during the etching of the first substrate 10 and the second substrate 20, a fume may be generated due to a chemical reaction and may infiltrate into masked regions of the first substrate 10 and the second substrate 20 to cause defects in the first substrate 10, the second substrate 20, and the driving circuit 30. Thus, the masking requires high tightness of the masking tape 40.

In order to prevent such defects, the masking is necessarily performed before the first substrate 10 and the second substrate 20 are etched. In an example according to embodiments of the present invention, the masking tape 40 having a size that is greater than areas of the first substrate 10 and the second substrate 20 is attached to entire surfaces of the first substrate 10 and the second substrate 20. In addition, only a region to be etched is removed by cutting the masking tape 40 using a knife.

In addition, in order to protect the driving circuit 30, since the driving circuit 30 is encapsulated, fixed, and sealed with the masking tape 40, the first substrate 10, the second substrate 20, and the driving circuit 30 are protected from the etching solution.

In addition, since the masking tape 40 having strong adhesive strength may be used, tightness of the masked region may be increased. In addition, after the etching is completed, the masking tape 40 is cut to correspond to sizes of the first substrate 10 and the second substrate 20 using a knife without being delaminated so that panel damage, which may occur when the masking tape 40 is removed, and defects due to adhesion of an adhesive may be prevented from occurring.

As another embodiment of the present invention, only a tape removal method according to embodiments of the present invention may be applied to the existing masking method, and a piece of tape is cut to correspond to a size of a panel using a knife without being delaminated so that a time of a process of removing the masking tape 40 may be shortened, and it is possible to prevent occurrence of defects which may occur when the masking tape 40 is removed.

A variety of modifications of the liquid crystal panel 1 are possible within the technical spirit of bonding a plurality of glasses. The liquid crystal panel 1 according to one embodiment is coupled in a state in which the first substrate 10 and the second substrate 20 face each other, and the liquid crystal layer is provided between the first substrate 10 and the second substrate 20.

According to one embodiment, the first substrate 10 is a color filter (CF) substrate and the second substrate 20 is a thin film transistor (TFT) substrate. The first substrate 10 is spaced a predetermined interval from the second substrate 20, and a liquid crystal is injected between the first substrate 10 and the second substrate 20 to form the liquid crystal layer.

The liquid crystal panel 1 has a structure in which the first substrate 10 and the second substrate 20 are bonded, and an electrode pattern is formed on the second substrate 20 to allow an electrical signal to be applied. A portion of the electrode pattern formed on the second substrate 20 is exposed to the outside of the second substrate 20 and designed to receive an electrical signal applied from the outside.

When the first substrate 10 and the second substrate 20 are bonded, some electrodes of the second substrate 20 are bonded to be exposed to the outside. Generally, the second substrate 20 is designed to have a total area that is greater than an area of the first substrate 10. The electrodes exposed from the second substrate 20 may be coupled to other devices to receive electrical signals.

In addition, the liquid crystal panel 1 is formed in a rectangular shape, and the second substrate 20 located on one side of the liquid crystal panel 1 is installed in a shape protruding further than the first substrate 10. A driving circuit 30 is connected to the second substrate 20. The driving circuit 30 includes the printed circuit board 32 and the flexible connector 34.

One side of the flexible connector 34 is connected to the printed circuit board 32, and the other side thereof is connected to the second substrate 20. The flexible connector 34 has a film shape which is easily bent, and the driving circuit 30 receives an external signal.

The masking tape 40 may be deformed in various shapes within the technical spirit of integrally covering the edges of the first substrate 10 and the second substrate 20. The masking tape 40 according to one embodiment is installed in the form of a rectangular band having a hollow 45 therein.

The masking tape 40 is installed in the form of surrounding non-etched regions of the first substrate 10 and the second substrate 20, and since the masking tape 40 is integrally formed, a joint is not provided separately. In addition, since the masking tape 40 is installed to surround an end portion of the driving circuit 30 connected to the second substrate 20, it is possible to prevent the driving circuit 30 from being separated from the second substrate 20.

Various types of acid-resistant materials may be used as the masking tape 40 within the technical spirit of preventing the etching solution from infiltrating into the first substrate 10 and the second substrate 20 during the etching. The masking tape 40 according to one embodiment employs polyvinyl chloride (PVC) and is a single film which surrounds the non-etched regions of the first substrate 10 and the second substrate 20.

The encapsulation member 50 is in the form of an envelope and prevents the etching solution from infiltrating into the driving circuit 30. In a state in which the encapsulation member 50 surrounds the driving circuit 30, the encapsulation member 50 may be fixed using a separate masking tape 40.

Figure 8:
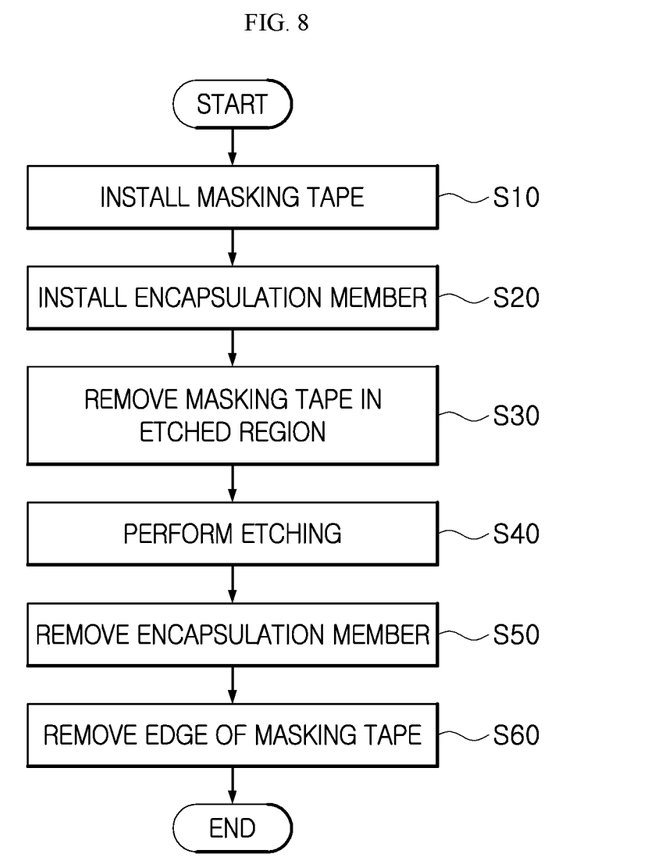
FIG. 8 is a flowchart illustrating a method of etching a liquid crystal panel according to one embodiment of the present invention.

Hereinafter, a method of etching a liquid crystal panel according to one embodiment of the present invention will be described with reference to the accompanying drawings. FIG. 8 is a flowchart illustrating a method of etching a liquid crystal panel according to one embodiment of the present invention.

As shown in FIGS. 1, 2, and 8, the method of etching a liquid crystal panel according to one embodiment of the present invention includes installing the masking tape 40 on entire surfaces of the first substrate 10 and the second substrate 20 (S10).

In the installing of the masking tape 40, the masking tape 40 is made of a single film and adhered and fixed to each of the first substrate 10 and the second substrate 20. In addition, it is characterized in that an area of the masking tape 40 is greater than an area of the first substrate 10 or the second substrate 20.

In addition, in the installing of the masking tape 40, the masking tape 40 is installed to surround an end portion of the driving circuit 30 connected to the second substrate 20. An upper side of the masking tape 40, which is installed on the first substrate 10, is installed to correspond to an upper side of the first substrate 10. In addition, left and right sides and a lower side of the masking tape 40, which are installed on the first substrate 10, protrude outward from the first substrate 10.

An upper side of the masking tape 40, which is installed on the second substrate 20, is installed to correspond to an upper side of the second substrate 20. In addition, left and right sides and a lower side of the masking tape 40, which are installed on the second substrate 20, protrude outward from the second substrate 20.

In addition, as shown in FIGS. 3 and 8, the method of etching a liquid crystal panel includes installing the encapsulation member 50 which surrounds an outer side of the driving circuit 30 connected to the second substrate 20 (S20). The encapsulation member 50 in the form of an envelope is installed on the outer side of the driving circuit 30 and fixed to the masking tape 40 using a separate tape.

In addition, as shown in FIGS. 4 and 8, the method of etching a liquid crystal panel includes removing an inner side of the masking tape 40 facing the etched region 60 of the first substrate 10 and the second substrate 20 (S30). After the hollow 45 located on the inner side of the masking tape 40 is cut using a laser or a knife for removing a film, the masking tape 40 cut from the first substrate 10 and the second substrate 20 is removed. In addition, a shape of the masking tape 40, of which the inner side is removed, is formed in the form of a rectangular band.

In addition, the method of etching a liquid crystal panel includes etching the first substrate 10 and the second substrate 20 due to the etching solution (S40). The etching solution etches the first substrate 10 and the second substrate 20 in the etched region 60 through the hollow 45 of the masking tape 40.

In addition, as shown in FIGS. 5 and 8, the method of etching a liquid crystal panel includes removing the encapsulation member 50 (S50). The encapsulation member 50 is removed from the masking tape 40, and thus the driving circuit 30 is exposed to the outside. In addition, as shown in FIGS. 6 and 8, the method of etching a liquid crystal panel includes removing an edge of the masking tape 40 (S60). The masking tape 40, which protrudes outward from the first substrate 10 and the second substrate 20, is cut. When the masking tape 40 is removed after the etching is completed, the masking tape 40 is cut to correspond to sizes of the first substrate 10 and the second substrate 20 using a knife without removal of the masking tape 40 in the non-etched region. Therefore, it is possible to decrease a process time required for the removing of the edge of the masking tape 40, and since an adhesive of the masking tape 40 is not attached to the first substrate 10 and the second substrate 20, appearance quality of the etched liquid crystal panel 1 may be improved. In addition, since the masking tape 40 having strong adhesive strength may be used without considering a delamination force of the masking tape 40, it is possible to prevent occurrence of defects due to infiltration of the etching solution.

Embodiments of the present invention relate to a method of etching a liquid crystal panel 1 at a set thickness so as to implement a curved display and relates to a masking method of protecting the driving circuit 30, the first substrate 10, and the second substrate 20 from the etching solution using the single piece of masking tape 40.

As described above, according to embodiments of the present invention, since the masking tape 40 made of a single film is used to protect the liquid crystal panel 1 and the driving circuit 30 from the etching solution, it is possible to reduce defects due to infiltration of the etching solution. In addition, since the masking tape 40 installed on the edges of the first substrate 10 and the second substrate 20 is not removed, it is possible to reduce damage of the liquid crystal panel 1, which occurs during the removing of the masking tape 40. In addition, the masking tape 40 having adhesive strength that is stronger than adhesive strength of masking tape according to the related art may be used so that tightness may be improved and it is possible to reduce defects of the first substrate 10 and the second substrate 20 due to infiltration of the etching solution. In addition, since the masking tape 40 made of a single member is used, a production process may be simplified and quality of the liquid crystal panel 1 may also be improved.

In addition, according to embodiments of the present invention, when the entire surfaces of the first substrate 10 and the second substrate 20 are masked using the masking tape 40 having high adhesive strength and then the etching is performed, there is no region in which the masking tape 40 attached to the first substrate 10 and the second substrate 20 overlaps. Therefore, it is possible to prevent defects due to infiltration of the etching solution and decrease the process time. In addition, when the masking tape 40 is removed, since the edge of the masking tape 40 is cut to correspond to the sizes of the first substrate 10 and the second substrate 20, it is possible to prevent damage of the first substrate 10 and the second substrate 20 and a phenomenon in which the adhesive remains on the first substrate 10 and the second substrate 20 so that it is possible to improve quality of the etched panel.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of etching a liquid crystal panel, comprising:
installing a masking tape on entire surfaces of a first substrate and a second substrate, wherein an area of the masking tape is greater than a sum of an area of the first substrate and an area of the second substrate;
installing an encapsulation member configured to surround an outer side of a driving circuit connected to the second substrate;
removing an inner side of the masking tape facing etched regions of the first substrate and the second substrate;
etching etched regions of the first substrate and the second substrate using an etching solution;
removing the encapsulation member; and
removing an edge of the masking tape;

wherein, in the installing of the masking tape, the masking tape is adhered and fixed to each of the first substrate and the second substrate and formed of a single film;

wherein the removing of the inner side of the masking tape includes cutting the inner side of the masking tape using a laser or a knife for removing a film and removing the masking tape which is cut from the first substrate and the second substrate;

wherein the removing of the edge of the masking tape includes cutting the masking tape protruding outward from the first substrate and the second substrate without removal of the masking tape in non-etched regions on the first substrate and the second substrate.

2. The method of claim 1, wherein in the installing of the masking tape, the masking tape is installed to surround an end portion of the driving circuit connected to the second substrate.

3. The method of claim 1, wherein in the removing of the inner side of the masking tape, a shape of the masking tape of which the inner side is removed is a shape of a rectangular band.

\* \* \* \* \*